(12) United States Patent
Johnson

(10) Patent No.: US 8,939,599 B2
(45) Date of Patent: Jan. 27, 2015

(54) SYSTEM FOR USE TO ENERGIZE LUMINESCENT OBJECTS

(76) Inventor: Keith Norman Johnson, Conway, SC (US)

( * ) Notice: Subject to any disclaimer, the term of this patent is extended or adjusted under 35 U.S.C. 154(b) by 498 days.

(21) Appl. No.: 13/191,025

(22) Filed: Jul. 26, 2011

(65) Prior Publication Data

US 2012/0026725 A1 Feb. 2, 2012

Related U.S. Application Data

(60) Provisional application No. 61/368,981, filed on Jul. 29, 2010.

(51) Int. Cl.
| | |
|---|---|
| *F21V 33/00* | (2006.01) |
| *F21L 4/00* | (2006.01) |
| *A01K 85/01* | (2006.01) |
| *F21V 21/40* | (2006.01) |
| *F21L 14/02* | (2006.01) |

(52) U.S. Cl.
CPC . *F21L 4/00* (2013.01); *A01K 85/01* (2013.01); *F21V 21/406* (2013.01); *F21L 14/02* (2013.01)
USPC .............................. 362/154; 362/155; 362/156

(58) Field of Classification Search
USPC .................................................. 362/154–156
See application file for complete search history.

(56) References Cited

U.S. PATENT DOCUMENTS

| 1,817,694 A | 8/1931 | Lafky | |
|---|---|---|---|
| 1,900,339 A | 3/1933 | Harrell | |
| 2,303,097 A | 11/1942 | Townsend et al. | |
| 5,311,413 A * | 5/1994 | Farmer et al. | 362/154 |
| 5,388,039 A * | 2/1995 | Dolph | 362/154 |
| 7,857,490 B1 * | 12/2010 | Fett et al. | 362/352 |
| 8,424,235 B1 * | 4/2013 | Anderson | 43/4 |

* cited by examiner

*Primary Examiner* — William Carter
(74) *Attorney, Agent, or Firm* — Moore & Van Allen PLLC; W. Kevin Ransom

(57) ABSTRACT

The present invention relates to a system for providing a light source for activating a luminescent object. In general, the system comprises a housing formed of at least two portions that are either separable or form a unitary housing depending on the embodiment. A first portion of the housing forms a light containment cavity, having at least one opening configured for receiving the luminescent object. A second portion of the housing is configured to contain a light source for providing light for activating the luminescent object. One or more light switches are located on the outside of the housing for activating the light source. In some embodiments, the opening is configured such that it can be covered by a user's hand to prevent light from escaping from the light containment cavity when the light source is activated. In some embodiments, one light switch is positioned relative to the opening so that the user can cover the opening and manipulate the light switch with one hand. In other embodiments, a cover may be associated with the opening to prevent light escaping during activation of the light source.

17 Claims, 13 Drawing Sheets

SYSTEM FOR USE TO ENERGIZE LUMINESCENT OBJECTS

CROSS-REFERENCE TO RELATED APPLICATION(S)

This application claims priority to U.S. Provisional Patent Application No. 61/368,981, filed on Jul. 29, 2010, and entitled System for Use to Energize Luminescent Objects, the contents of which are hereby incorporated by reference.

FIELD OF THE INVENTION

In general, embodiments of the invention relate to systems for energizing or activating a luminescent object, such as a fishing bait, ball, etc.

BACKGROUND

Luminescent items are used in various activities. For example, fishermen use fishing lures which are coated with a phosphorescent or photoluminous material. When activated, the coating glows and is visible by fish. These lures are typically used for night fishing. Examples of such lures are disclosed in the following U.S. patents: U.S. Pat. No. 1,817,694, U.S. Pat. No. 1,900,339, and U.S. Pat. No. 2,303,097. Another example is night golf, where players use a luminescent golf ball. Still another example is use of luminescent paint balls for night paint ball games. Still various other uses of luminescent objects are known, such as on safety garments or incorporation in safety devices.

Activation of the luminescent object is typically accomplished using items such as incandescent light sources, e.g., flashlights, vehicle headlights, spot lights, etc., or other light sources such as lanterns, lighters, etc. for activating the photoluminous material. In some instances, flash from a camera has been used to provide a more intense light activation of the photoluminous material.

A noted issue with current methods for activating the photoluminous material is the problems with loss of night vision by the user of such systems. As is generally known, humans will develop a certain level of night vision the more their eyes adjust to darkness. The pupils with dilate to allow entry of more light into the eye. However, this developed night vision is easily reversed when the eye is subjected to light. The user's pupils will attempt to adjust to the light and thus degrade the user's night vision. In this regard, many of the devices and systems currently used to activate the photoluminous material on the bait, ball or other object may degrade the user's night vision during the activation process, as many of these systems do not shield the user's eyes from the light source during activation of the luminescent object.

BRIEF SUMMARY

The present invention relates to a system for providing a light source for activating a luminescent object. In general, the system comprises a housing formed of at least two portions that are either separable or form a unitary housing depending on the embodiment. A first portion of the housing forms a light containment cavity, having at least one opening configured for receiving the luminescent object. A second portion of the housing is configured to contain a light source for providing light for activating the luminescent object. One or more light switches are located on the outside of the housing for activating the light source. In some embodiments, the opening is configured such that it can be covered by a user's hand to prevent light from escaping from the light containment cavity when the light source is activated. In some embodiments, one light switch is positioned relative to the opening so that the user can cover the opening and manipulate the light switch with one hand. In other embodiments, a cover may be associated with the opening to prevent light escaping during activation of the light source.

In some embodiments, the housing is formed into multiple pieces, such that the portion containing the light source is removable. In this embodiment, the light source can be removed by the user and used separately as a flash light or spot light. An articulating handle or a rigid handle may be provided for facilitating use of the light source as a hand held light source. Some embodiments provide a seal, where the seals provide a means for excluding outside elements (e.g. moisture, dirt, debris, air, etc.) from the interior of the coupled housing portions.

Yet other embodiments include a first housing portion that is shaped to maximize focus of the light on the luminescent object (e.g. parabolic, hyperbolic, concave, convex, etc.). Such embodiments provide one or more focal points in which light is focused on to the photoluminous material. Because more than one photoluminous pieces may be activated with the device at one time, which of course depends on the specific configuration and application of each embodiment, multiple focal points may be necessary depending on the specific configuration.

Some embodiments include a stand which provides a stable platform for placing the system on a support surface. Some configurations are designed such that the stable platform securely supports any one or more of the first housing portion, the second housing portion, or the coupled first and second housing portions on a support surface. A clamp is provided in some embodiments used for securely fastening the platform to a support surface.

Still other embodiments include a storage compartment for stowing items on or in the coupled or uncoupled housing portions. Storage compartments may include a storage compartment cover, hinged or otherwise fastened to the housing. Yet other embodiments may include a coverless storage compartment, allowing open access to stowed items. Some configurations include a storage compartment located in or on the platform.

A retractable cord mechanism is provided in some embodiments, which provides a method of stowing the power cord used for powering the light source.

For example, in one embodiment, the invention is a system for providing a light source for activating a luminescent object. The system comprises a housing formed of at least two housing portions, where a first housing portion of the housing forms a light containment cavity, having at least one opening configured for receiving the luminescent object. The second housing portion is configured to contain a light source for providing light for activating the luminescent object.

In some embodiments, the first and second housing portions are separable. In this embodiment, a coupling may be located between the first and second housing portions to couple the two together. In at least one embodiment, the system may further include a seal between said housing portions, where the seal comprises means for excluding any one or more of moisture, dirt, debris and air from the interior of the coupled first and second housing portions.

In some embodiments, the second housing portion may include a handle. In some embodiments, the handle is articulated and is configurable in the following positions: 1) generally parallel to a longitudinal dimension of the second housing portion, and 2) generally perpendicular to a lateral dimension of the second housing portion.

In some embodiments, the system may further comprise a switch located on an exterior surface of the first housing portion adjacent to the opening, where the switch electrically connects the light source to a power source.

The interior wall of the first housing portion may comprise a reflective layer to reflect light from the light source in a direction toward the luminescent object.

In some embodiments, the system comprises a stand coupled to the first housing portion and configured to support the first housing portion on a support surface. The system may also include at least one storage compartment and/or a retractable cord storage mechanism.

In a separate embodiment, the present invention may be embodied in a system for providing a light source for activating a luminescent object, where the system comprises a power source, a first housing portion forming a light containment cavity, a second housing portion containing a light source, and a first electric switch electrically connected between said power source and the light source for selectively supplying power to the light source. In this embodiment, the second housing is operably removable from the first housing portion, such that the second housing portion may be used as a light source independent of the first housing portion.

In one embodiment, the first electric switch is located on the second housing portion such that the first switch is used to supply power to the light source when the second housing portion is connected to the first housing portion and when the second housing portion is removed from the first housing portion and used as a separate light.

In an alternative embodiment, a first electric switch is located on the first housing portion, and a second electric switch located on the second housing portion, wherein both the first and second electric switches are electrically connected between said power source and the light source for, in tandem, selectively supplying power to the light source.

BRIEF DESCRIPTION OF THE DRAWINGS

Figure 1:
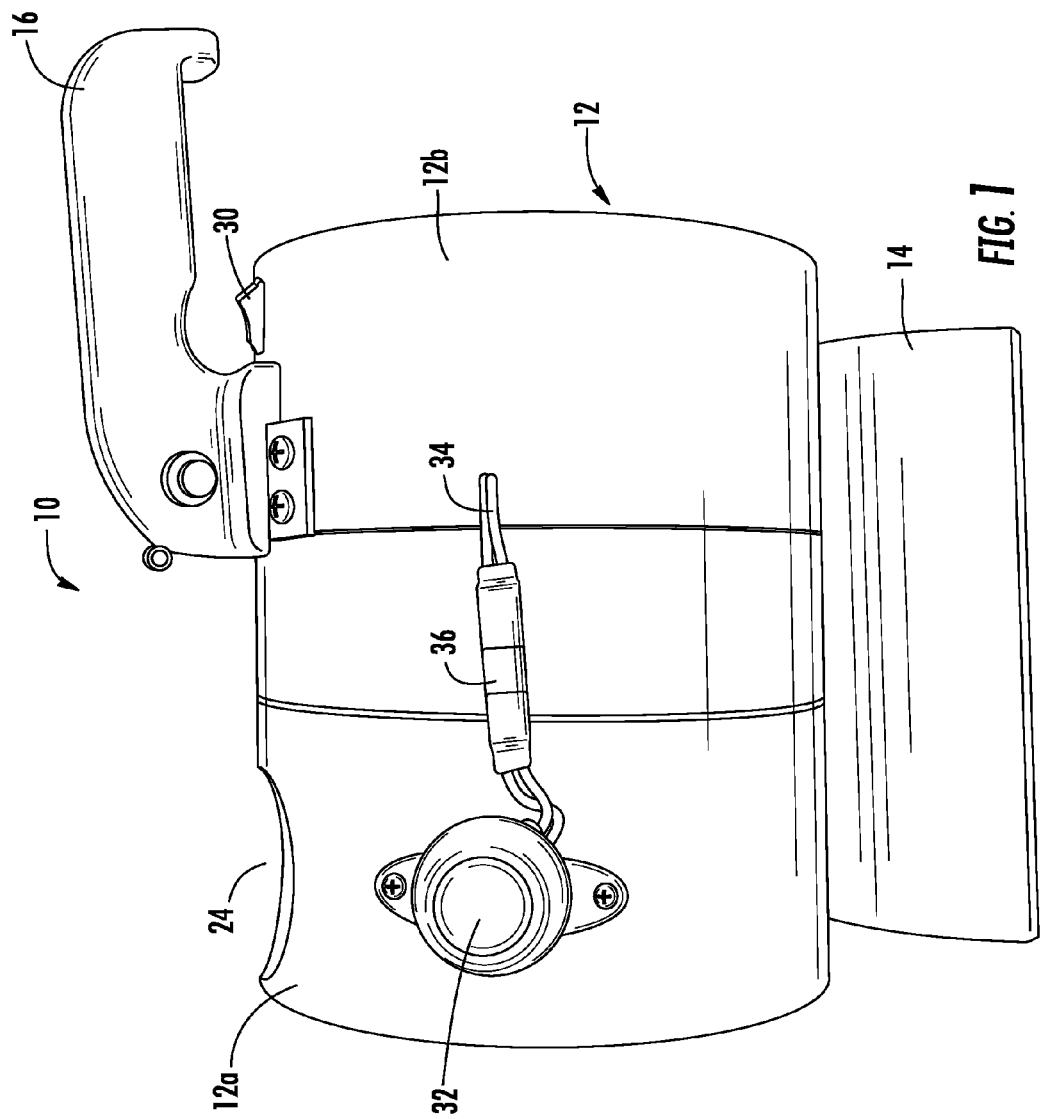
Figure 2:
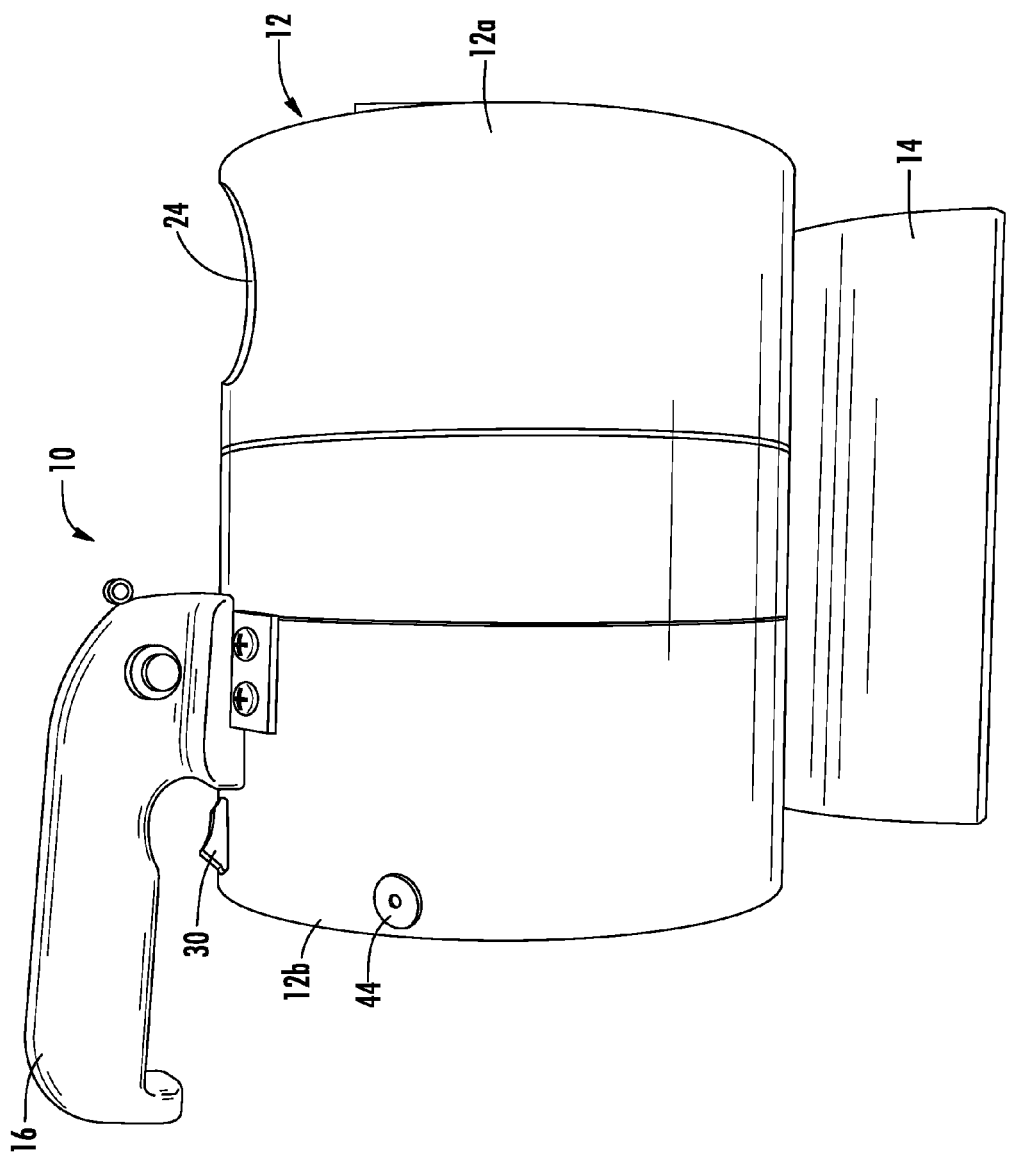
Figure 3:
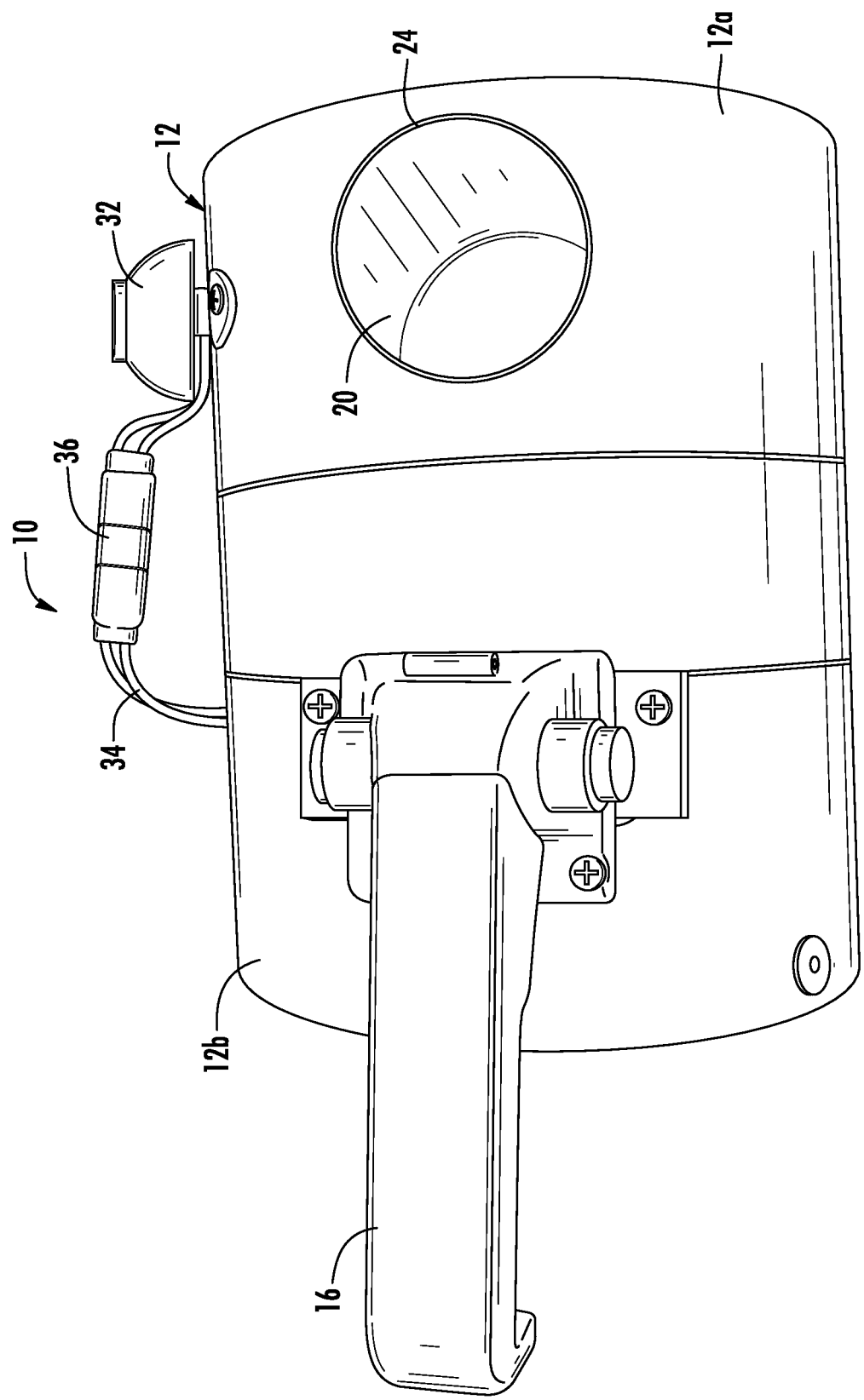
Figure 4:
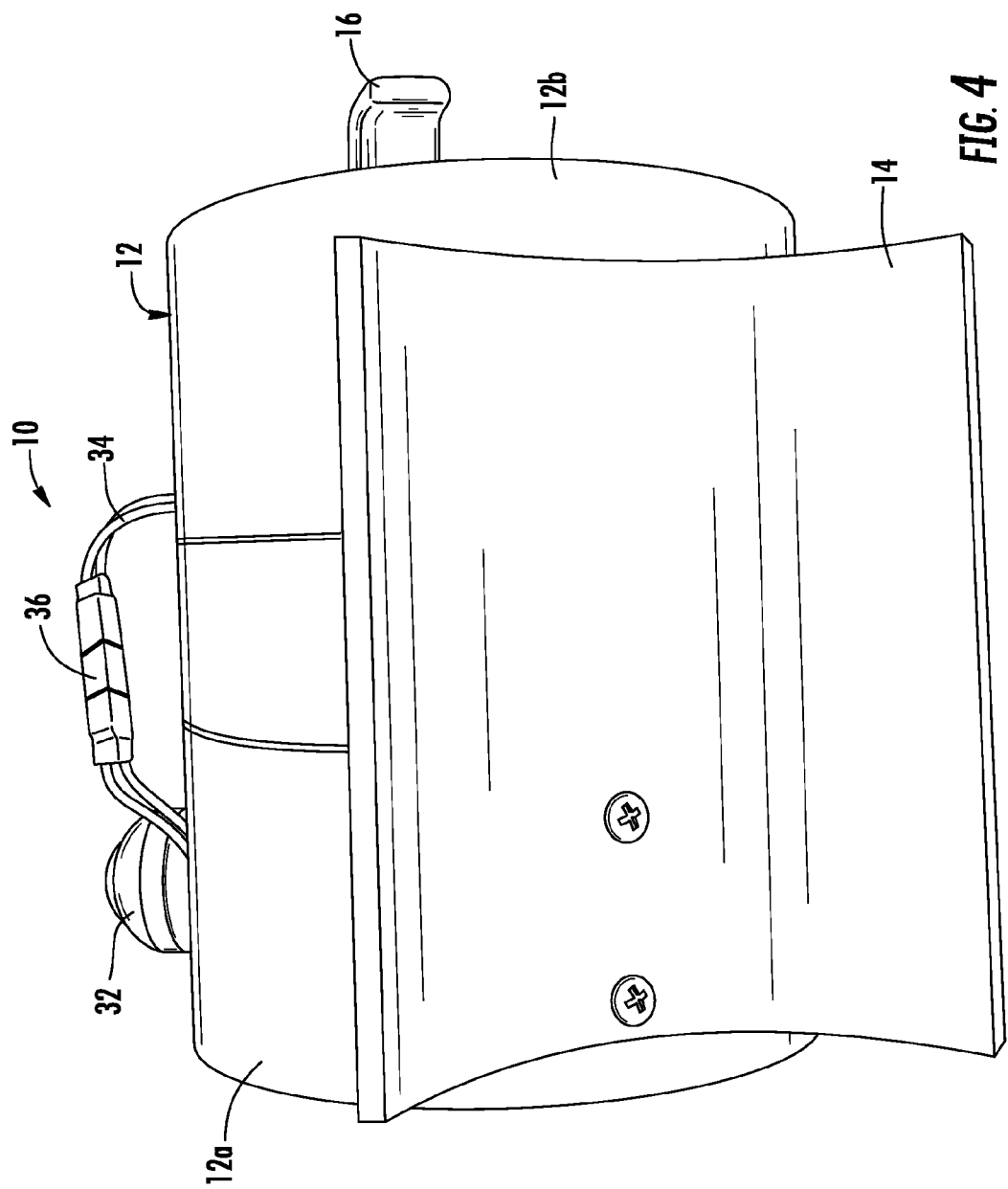
Figure 5:
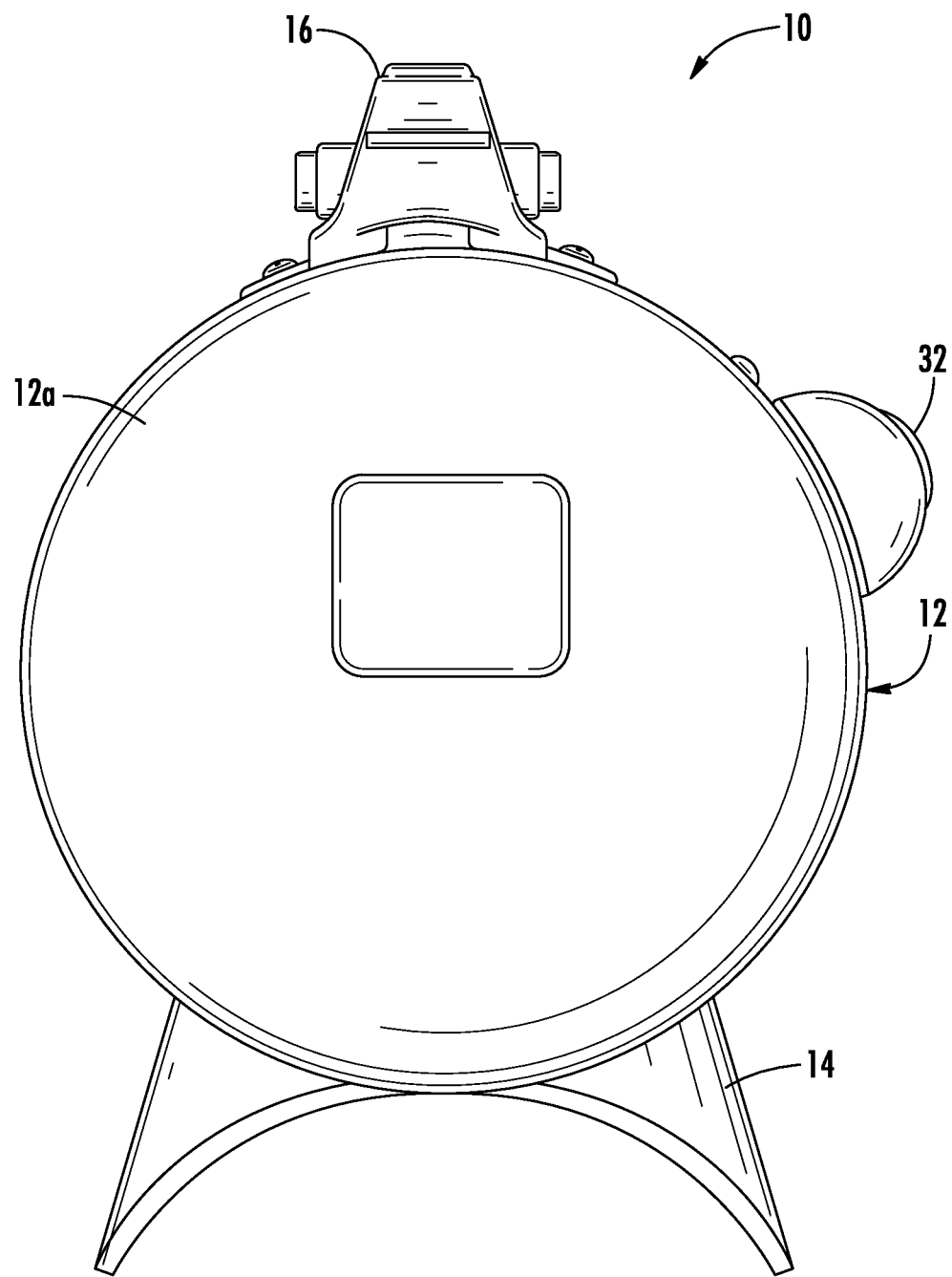
Figure 6:
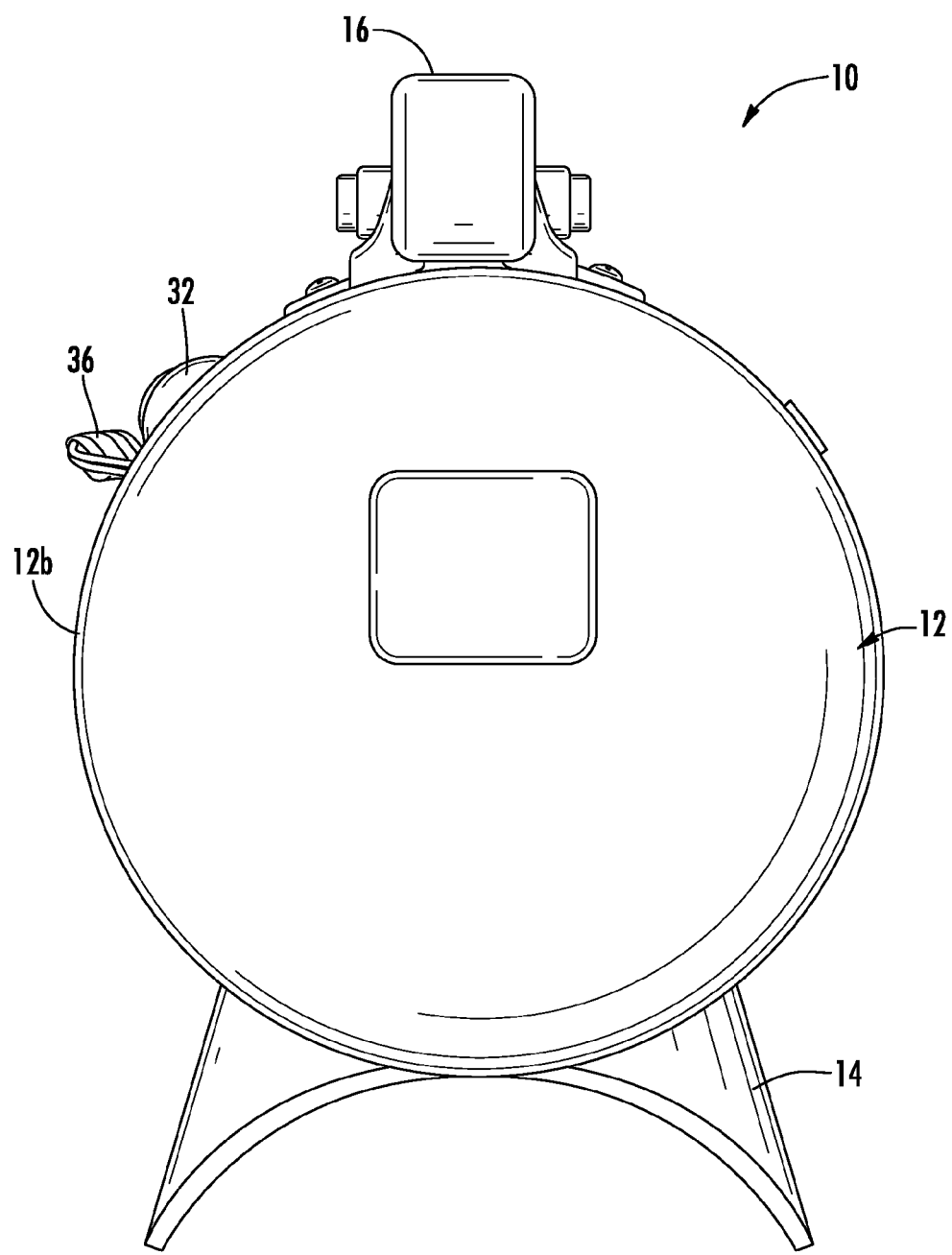
Figure 7:
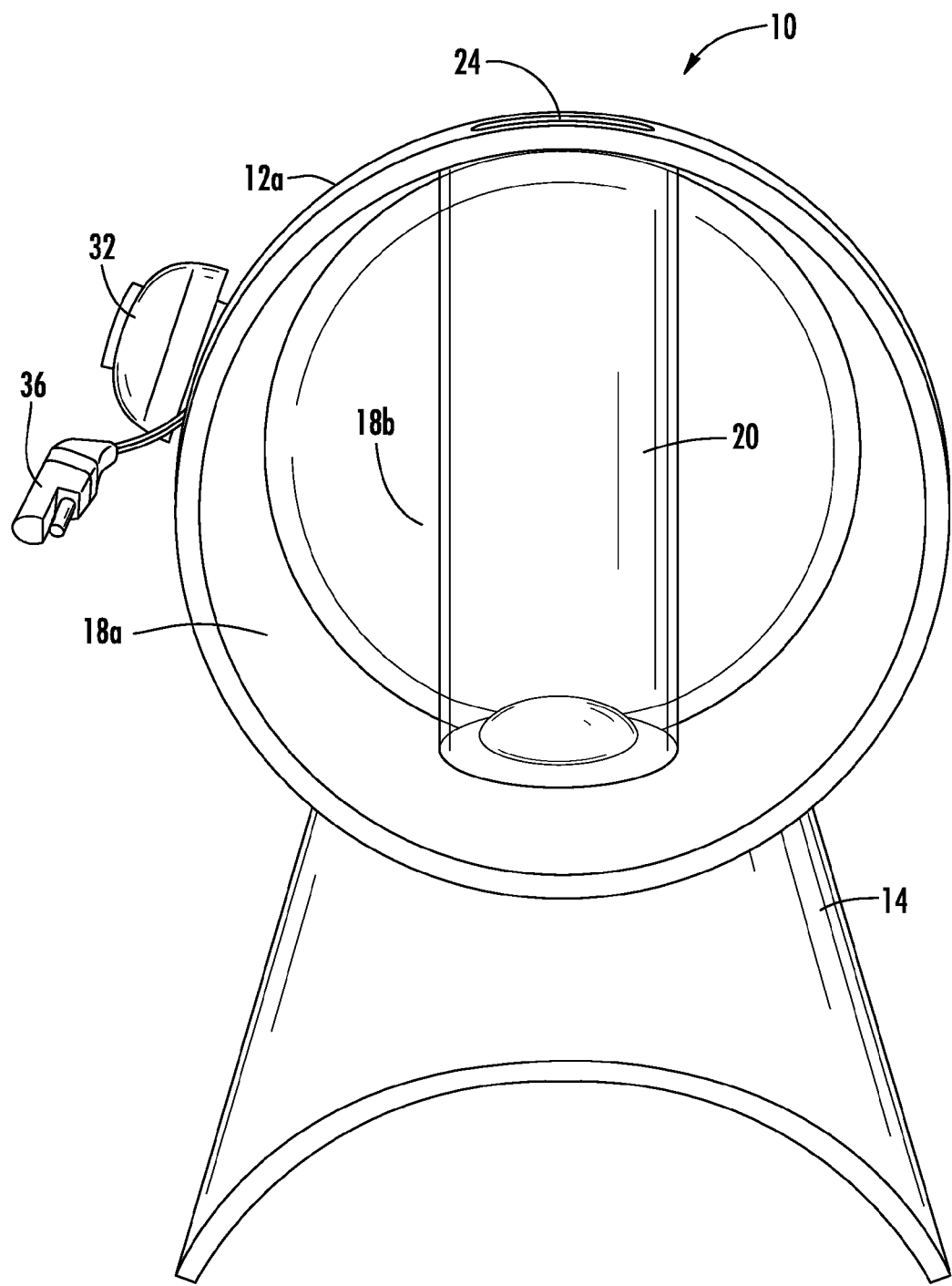
Figure 8:
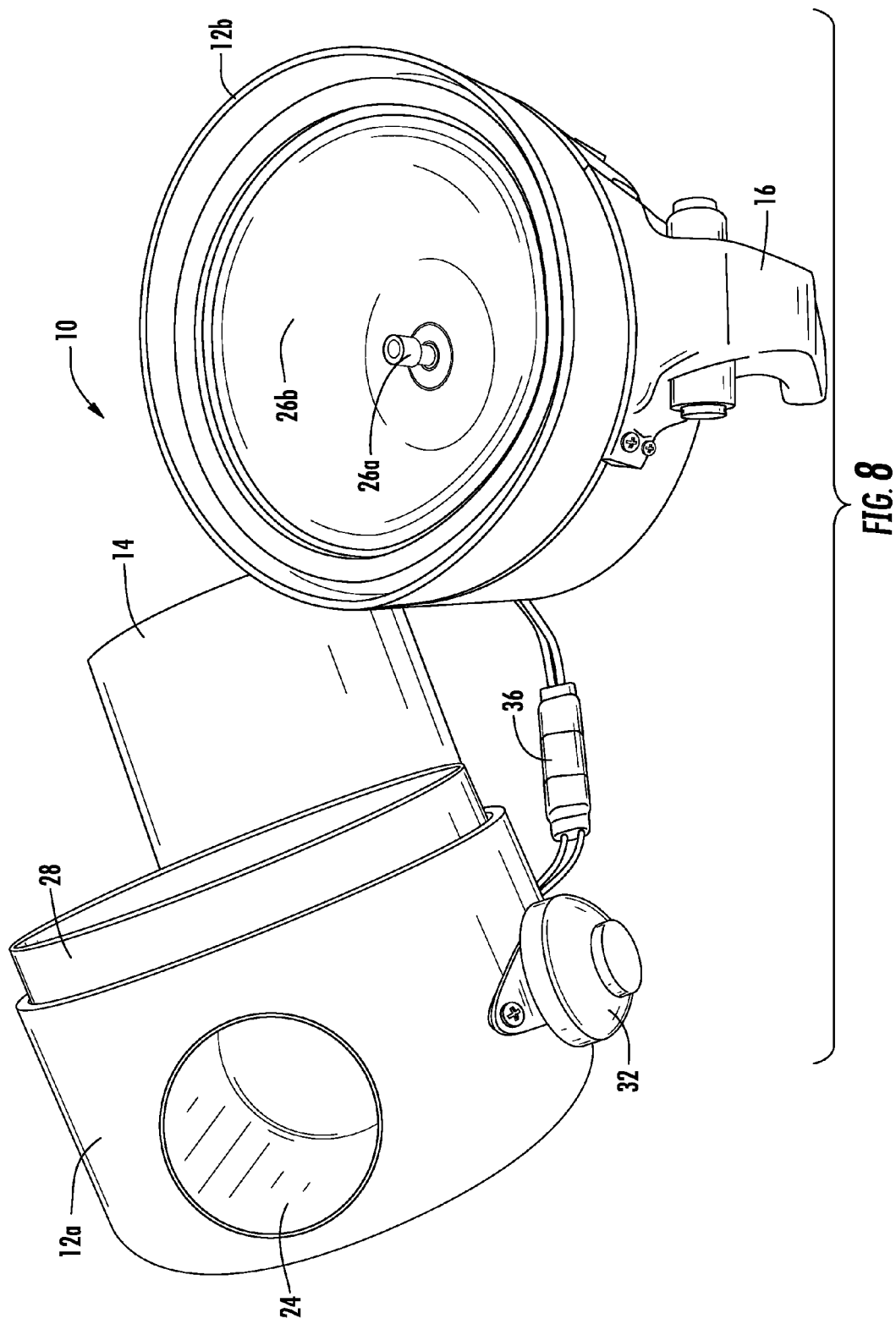
Figure 9:
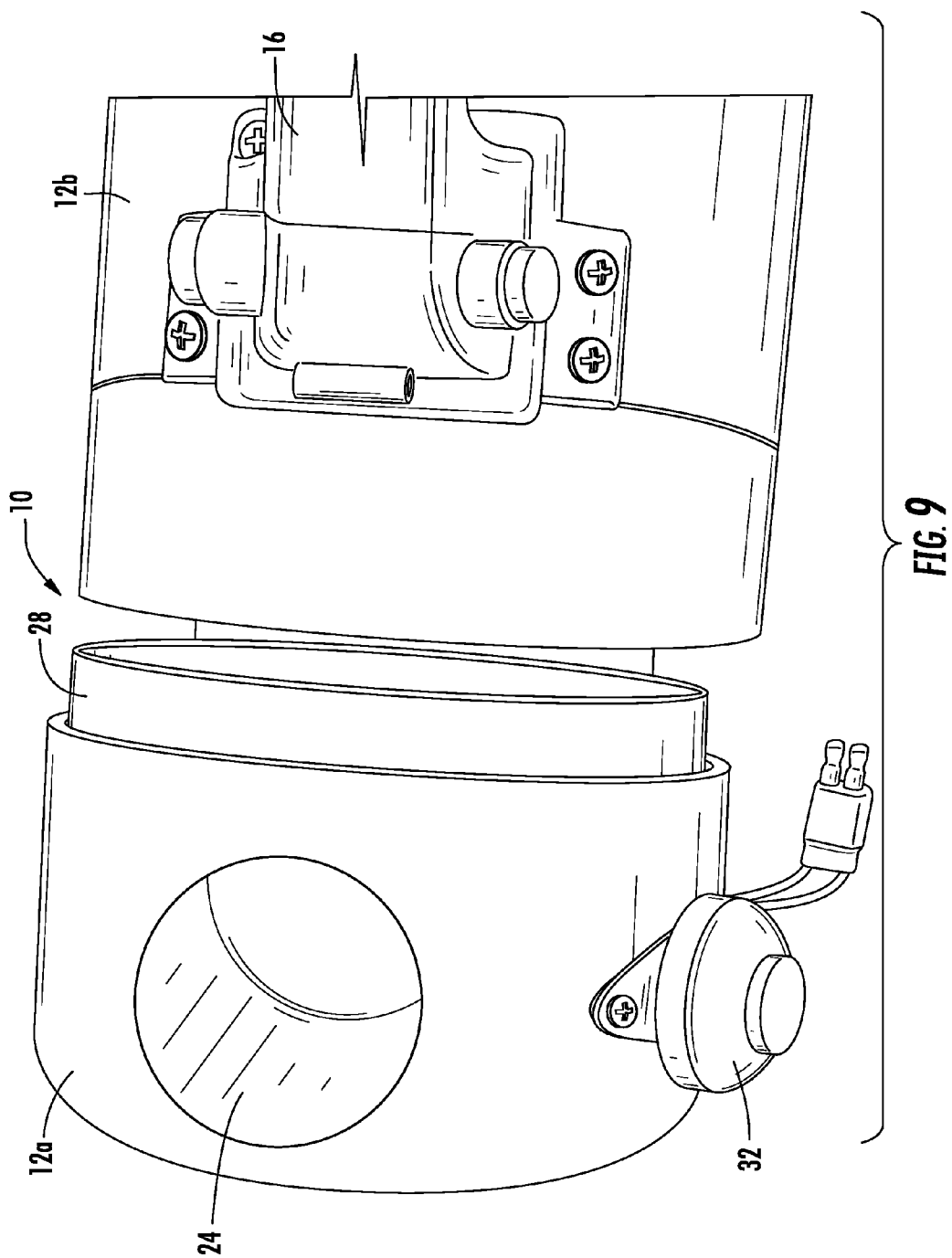
Figure 10A:
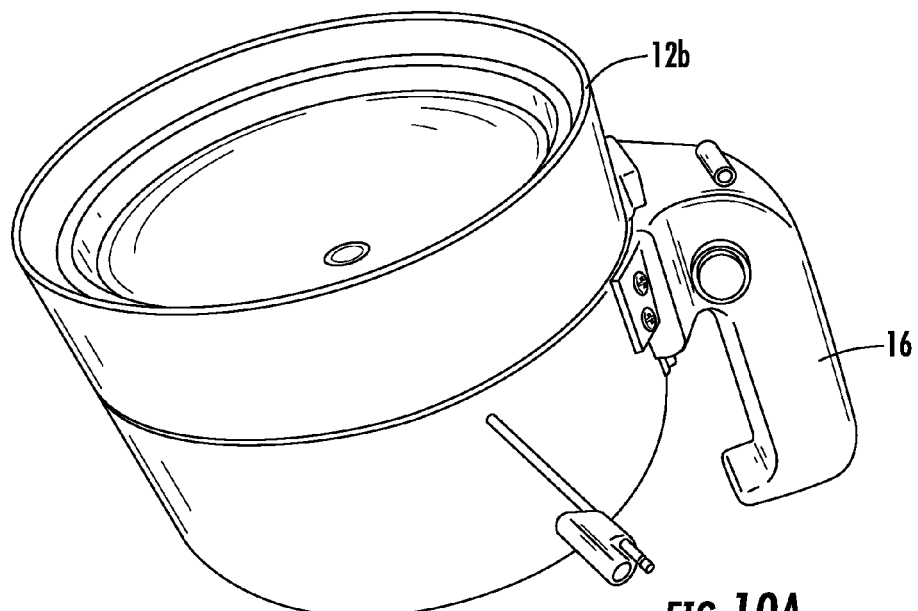
Figure 10B:
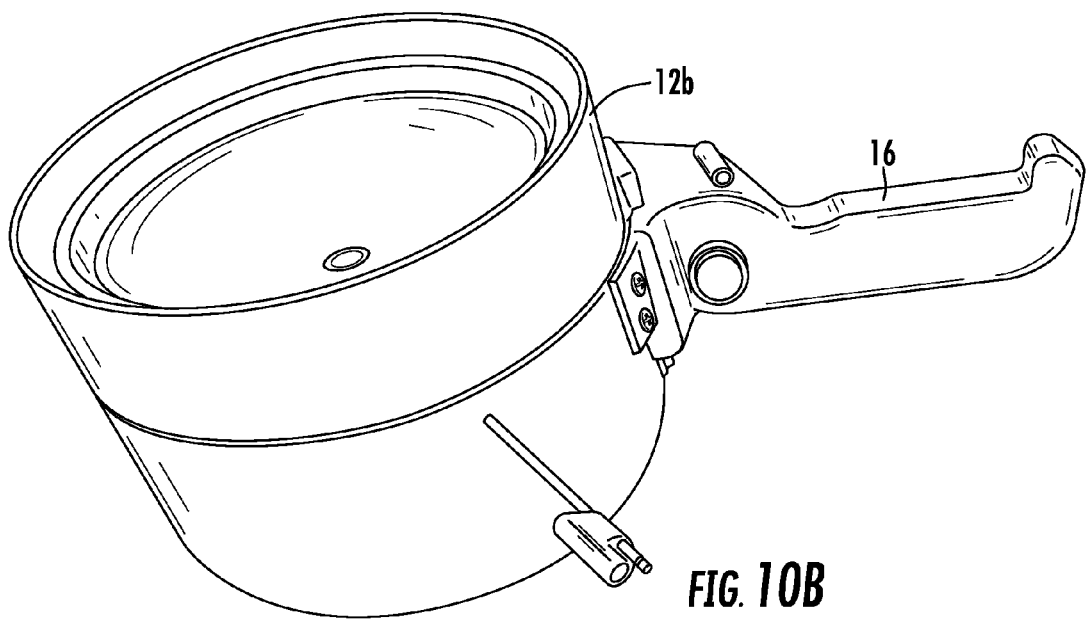
Figure 10C:
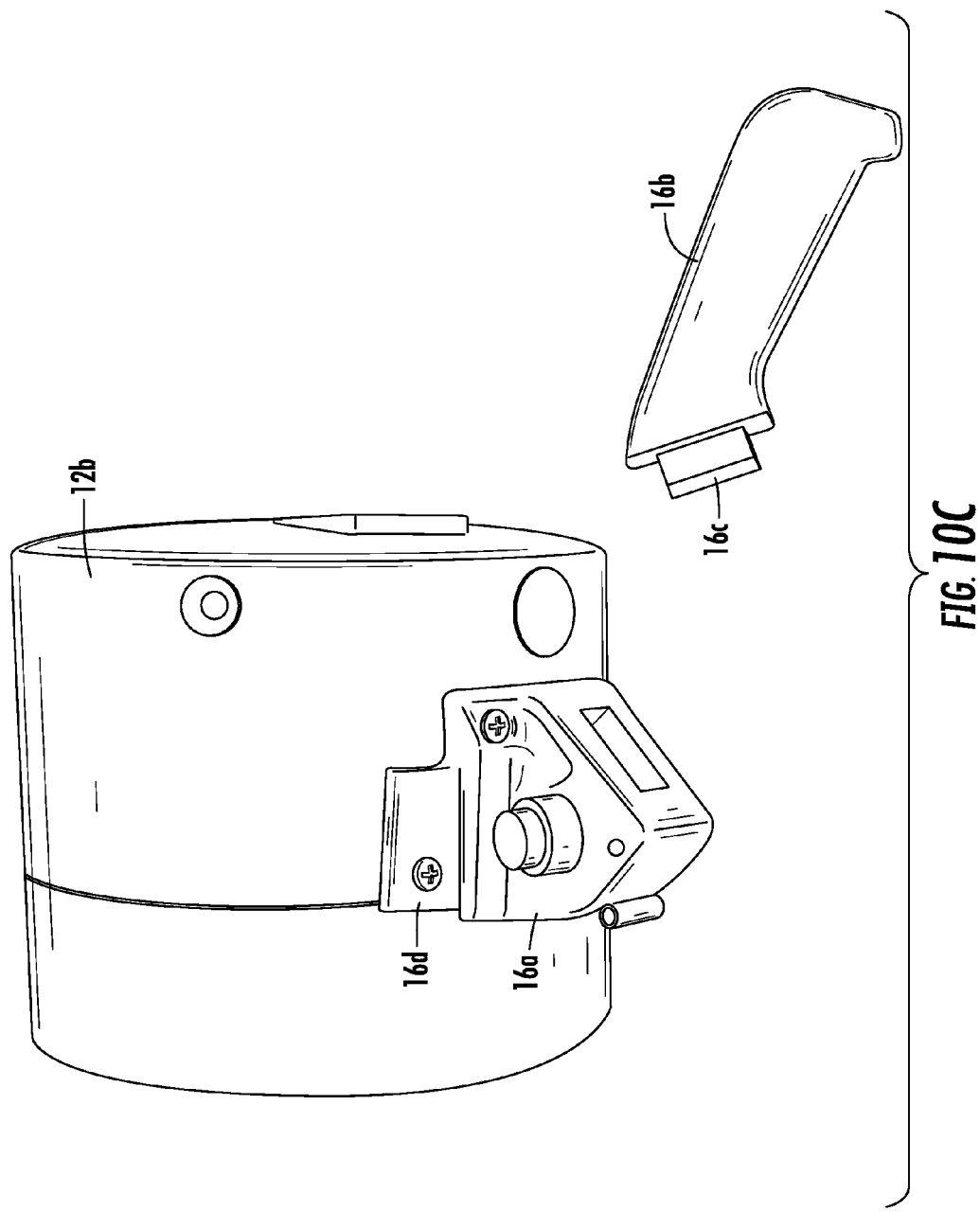
Figure 11:
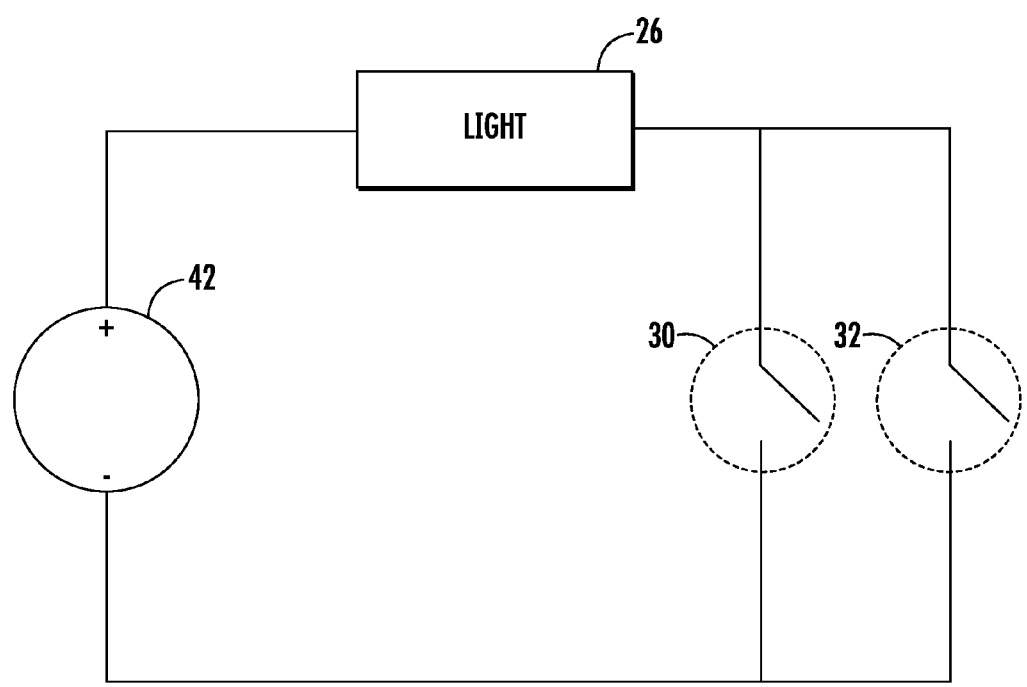
Figure 12:
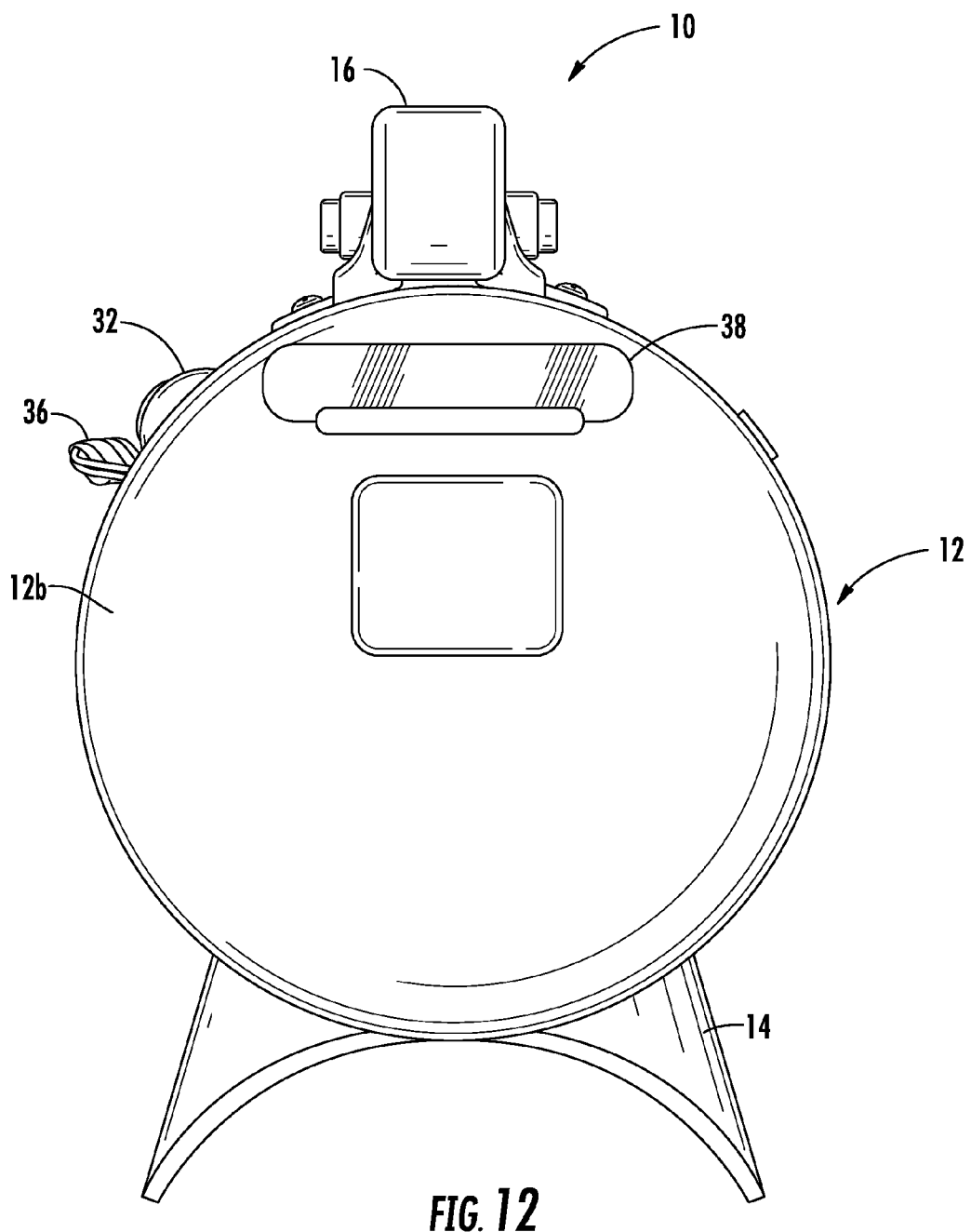

Having thus described embodiments of the invention in general terms, reference will now be made to the accompanying drawings, wherein:

a. FIG. 1 is a front side view of the system according to one embodiment of the present invention;

b. FIG. 2 is a back side view of the system according to one embodiment of the present invention;

c. FIG. 3 is a top side view of the system according to one embodiment of the present invention;

d. FIG. 4 is a bottom side view of the system according to one embodiment of the present invention;

e. FIG. 5 is a left side view of the system according to one embodiment of the present invention;

f. FIG. 6 is a right side view of the system according to one embodiment of the present invention;

g. FIG. 7 is a cross-sectional view of the housing of the system according to one embodiment of the present invention;

h. FIG. 8 is a perspective view of the first and second housing portions of the housing in a separated state according to one embodiment of the present invention;

i. FIG. 9 is a top view of the first and second housing portions of the housing in a separated state according to one embodiment of the present invention;

j. FIGS. 10A and 10B illustrate alternate views of the handle configuration according to one embodiment of the present invention;

k. FIG. 10C illustrates a view of the handle of the system according to one embodiment of the present invention;

l. FIG. 11 is a circuit diagram of the electrical connection of the light source to the power source according to one embodiment of the present invention; and m. FIG. 12 is an alternative right side view of the system according to one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

FIGS. 1-6 illustrate a front, back, top, bottom, left and rights side views of a system 10 according to one or more embodiments of the present invention. As illustrated, the system 10 comprises a housing 12. While the housing 12 is illustrated as cylindrical in shape, it is understood that the housing can be of any shape. In some embodiments, a stand 14 is associated with the housing. A handle 16 may also be associated with the housing 12.

The housing comprises a first housing portion 12a defining a light containment cavity 22. Specifically, as illustrated in FIG. 7 illustrating a cross-sectional view of the housing 12, the light containment cavity 22 is defined by one or more side walls 18a, 18b. The light containment cavity 22 is formed a non-translucent material so as to contain light and prevent light from being emitted outside the housing 12.

As illustrated, the first housing portion 12a includes an opening 24. The opening 24 is sized to receive the luminescent object, such as a fishing lure, golf ball, paint ball, or other item. The opening 24 allows a user to place the luminescent object in the light containment cavity 22.

As illustrated, in some embodiments, the light containment cavity 22 may further include an object retainer 20. The object retainer 20 is located adjacent to the opening 24 and is sized and configured to retain the luminescent object placed in the opening 24. While the object retainer 20 is illustrated as an enclosed housing, it is understood that the object retainer 20 could take any form structured for retaining the luminescent object in the housing 12, such as a hook, strap, shelf, etc. Further, the object retainer 20 may be of different sizes and/or shapes for different sized, shaped objects.

As will be discussed below, a light source 26 is used to illuminate the light containment cavity 22 to thereby activate the luminescent object located therein. In some embodiments, one or more of the walls 18a, 18b may include a reflective material or layer located on the wall to reflect the light from the light source in the light containment cavity 22. Is some embodiments, one or more of the walls 18a, 18b may be shaped, positioned, etc. to maximize focus of the light on the luminescent object placed in the light containment cavity 22. Similarly, the object retainer 20 may also be configured to focus light on the luminescent object. In some embodiments, the object retainer 20 may be formed of a translucent material structured to magnify the light incident on the luminescent object.

FIG. 8 illustrates a second portion 12b of the housing 12. As illustrated, the second portion 12b of the housing includes a light source 26. The light source comprises a bulb 26a or bulbs and a reflector 26*b*, where the reflector redirects light incident thereon toward the first housing portion 12*a* and at the luminescent object. In the illustrated embodiment, the light source is a flash light or spot light located in a housing. The light source 26 may be of any desirable type depending on the amount of light to be generated and/or energy savings concerns. For example, the light source may incorporate different types of lights such as incandescent, fluorescent, xenon, halogen, LED, etc. The light source may include combinations of such lights also. For example, different types of luminescent objects may require different levels of illumination for activation. The system could include, for example, an incandescent bulb of lower intensity illumination and a halogen bulb for higher level illumination.

Further, the lights source is connected to a power source. The power source may be configured in various manners. For example, the power source may be a battery in the housing 12*b*, such as either a one-time use, replaceable battery or a rechargeable battery. In other embodiments, the light source may include lead wires (cord) for connecting to an external power source, such as an external battery, power outlet, vehicle cigarette lighter, etc.

The first and second housing portions 12*a*, 12*b* may be formed as a unitary piece. However, in some embodiments, as illustrated in FIGS. 8 and 9, the two portions may be separable. For example, in some embodiments, the second housing portion 12*b* may be separable from the first housing portion 12*a*, so that the light source 26 may be used separately from the first housing portion 12*a*, as a general light source. For example, where the system 10 is used to activate fishing lures, the user may wish to use the light source 26 as a separate unit for lighting the surroundings as the user drives the boat to the fishing spot and/or for lighting the fishing area when needed. In these instances, the user can use the second housing portion 12*b* of the housing 12 as a separate unit. In this manner, the system 10 of this embodiment is a dual use system. When the first and second housing portions 12*a*, 12*b* are joined together, the system is used to activate luminescent objects, and when separated, the second housing portion 12*b* can be used independently as a light source.

In this regard, as illustrated in FIGS. 8 and 9, the housing portions 12*a*, 12*b* may include structures that allow the two portions to be connected to each other. For example, in the illustrated embodiment, the first housing portion 12*a* includes a lip 28 that is a smaller in diameter than the inner wall of the second housing portion 12*b*, so that the second housing portion 12*b* can fit over the lip 28 to thereby connect the first and second housing portions 12*a*, 12*b* together. While not shown, various types of locking mechanisms may be used to lock the first and second housing portions 12*a*, 12*b* together. Further, while not shown, a seal or series of seals, such as o-rings, may be located between the first and second housing portions 12*a*, 12*b* for sealing the two housing portions together as either a water tight, air tight, or both a water tight and air tight seal.

FIGS. 8 and 9 illustrate only one of a variety of connection mechanisms for joining the first and second housing portions 12*a*, 12*b* together. Any suitable connection and locking system can be used to join the two housing portions. Further, any suiting sealing mechanism may be employed to seal the two units together if a water and/or air tight seal is desired.

As discussed above, in some embodiments, the light source 26 may be used separately from the first housing portion 12*a*. As illustrated in FIGS. 1-10B, the second housing portion 12*b* may include a handle 16. As illustrated in FIG. 10A, the handle may configured in a first position which is generally parallel to a longitudinal dimension of the second housing portion 12*b*, such that handle can be used to move the housing 12 when first and second housing portions 12*a*, 12*b* are connected. However, as illustrated in FIG. 10B, in some embodiments, the handle 16 may be reconfigurable so that the handle 16 can be grasped in order to use the light source 26 separate from the first housing portion 12*a* as a flash light or spot light. For example, in some embodiments, the handle 16 may be configured generally perpendicular to a lateral dimension of the second housing 12*b*.

The reconfigurable handle 16 can be structured in various ways to allow for either horizontal or vertical orientation. For example, as illustrated in FIG. 10C, in one embodiment, the handle 16 may comprise a base portion 16*a* and a handle portion 16*b*. In the illustrated embodiment, the handle portion 16*b* is removable from the base portion 16*a*. The handle portion 16*b* includes a tang 16*c* extending therefrom that meshes with spring loaded pins, not shown, in the base portion 16*a*. By depressing push buttons 16*d*, the spring loaded pins disengage the tang 16*c* allowing the user to separate the handle portion 16*b* from the base portion 16*a*, reorient the handle portion 16*b* and reinsert the tang 16*c* into the base portion 16*a* to provide the handle in a different orientation.

In an alternative embodiment, the handle portion 16*b* could employ a tang 16*c* having a ball at a distal end that communicates with a socket in the base portion 16*a*, such that the handle portion 16*b* can be selectively rotated relative to the base portion 16*a* to either a horizontal or perpendicular orientation.

Referring again to FIG. 1, as illustrated, in some embodiments, the system 10 may include a first switch 30 located on the second housing portion 12*b*. This switch is electrically located between the light source 26 and the power source for selectively providing power to the light source 26. This first switch 30 can be used when the first and second housing portions 12*a*, 12*b* are connected to illuminate the luminescent object. The first switch 30 is also useful when the first and second housing portions 12*a*, 12*b* are separated and the second housing portion 12*b* with the light source 26 is used as a separate light source, such as a flash light or flood light.

As illustrated at least in FIG. 1, in some embodiments, the system 10 may include a second switch 32 located proximate to the opening 24 in the first housing porting 12*a*. (In some embodiments, where the first and second housing portions 12*a*, 12*b* cannot be separated, the second switch 32 may be the only switch on the system 10). As illustrated, the second switch 32 is electrically connected between the light source 26 and the power source by wiring 34.

The second switch 32 is located proximate to the opening 24 to provide for one hand operation. Specifically, during operation, after the user has placed the luminescent object in the opening 24, the user may place his/her hand over the opening 24 to thereby cover the opening. The user can then manipulate the second switch 32 to operate the light source 26 to illuminate the luminescent object located in the housing.

The second switch 32 may take many different forms. In some embodiments, it is a simple on/off selectable flip switch. In other embodiments, the second switch 32 is an intermittent push button switch, which completes an electrical circuit between the light source 26 and the power source only when the push button of the switch is depressed. Such a push button switch allows for easy use and allows the user to easily operate the light source 26 for a selected illumination period. For example, the user may place his/her hand over the opening 24 in the first housing portion 12*a* and use his/her palm to operate the second switch 32.

In other embodiments, the second switch 32 may be more sophisticated in nature. For example, the switch may be a timer switch, which when activated, remains activated for selected time to provide a selected illumination period for illuminating the luminescent object. The switch may be configured to turn the light source on and off a number of times to strobe the luminescent object. The switch could be a capacitance type switch that activates when the user's hand comes in contact with the switch. Again, any form of switch is envisioned. Further, the first switch 30 may be of any switch configuration similar to what is described above for the second switch, if desired.

As illustrated in at least FIG. 1, the second switch 32 includes wiring 34 for completing a circuit between the second switch 32, light source 26, and power source. While this wire is illustrated as external to the housing 12, in most embodiments, the wiring is internal to the housing 12. As illustrated in FIG. 1, in some embodiments, the first and second housing portions 12*a*, 12*b* are separable. In these embodiments, a connector 36 may be provided in the wiring 34. The connector is used to connect first and second portions of the wiring when the first and second housing portions 12*a*, 12*b* are connected and disconnected when the first and second housing portions 12*a*, 12*b* are disconnected.

Various types of electrical connectors are contemplated for the connector 36. For example, the wiring 34 and the connector 36 are typically internal to the housing 12. The connector 36 could be a contact type connector where the two sides of the connector make electrical contact when the first and second housing portions 12*a*, 12*b* are connected. Direct electrical connection, capacitance type connection, etc. are all contemplated.

As illustrated in FIG. 1, in some embodiments, both first and second switches 30, 32, respectively are provided. In these embodiments, the first and second switches are configured so that the second switch 32 may be used to operate the light source 26 when the first and second housing portions 12*a*, 12*b* are connected for illuminating a luminescent object located in the housing. Specifically, as illustrated in FIG. 11, the electrical circuit illustrates the first and second switches 30, 32 configured electrically in parallel. As illustrated, when the second switch 32 is connected to the circuit via the connector 36 and wiring 34, either switch 30, 32 may be used to complete the circuit between the circuit between the power source 42 and the light source 26.

As illustrated in at least FIG. 1, the system 10 may also include a stand 14. The stand provides a stable platform for placing the system 10 on a support surface. The stand 14 may have sufficient weight to prevent tipping of the system 10. Velcro or similar material may be used to attach the stand 14 to the support surface. It is understood that the stand may take any number of forms. For example, the stand 14 may comprise a clamp for clamping the system 10 to a support structure, such as the side of a boat or console. In some embodiments, the stand may be collapsible and/or removable from the housing 12.

As illustrated in FIG. 4, in embodiments where the first and second housing portions 12*a*, 12*b* are separable, the stand 14 is only connected to the first housing portion 12*a* so that the second housing portion 12*b* can be removed without obstruction by the stand. FIG. 4 illustrates the stand connected in a stationary manner to the first housing portion 12*a* by screws. In other embodiments, the housing 12 may be rotatable relative to the stand 14, such as by an axle or bearing system.

Embodiments of the system 10 may include various other features, attachments, etc. to expand the use and function of the system 10. For example, in some embodiments, the object retainer 20 may be luminescent, such that it glows in the dark thereby aiding the user when using the system in a dark environment.

In some embodiments, a separate light may be provided to aid the user when using the system 10 in a dark environment. For example, with reference to FIG. 12, separate light could be located on the second housing portion 12*b*, such as at location 38. The separate light can be connected to the power source and have a separate switch so as to be used selectively by the user. In some embodiments, the separate light may be a black light or other type of light that would reduce loss of night vision by the user when the light is in use, as opposed to a brighter light that would destroy the user's night vision.

Referring to FIG. 7, in some embodiments, the system 10 may include a storage compartment located anywhere on the system 10, such as for example in the area 40 under the stand 14, for retaining various items, such as batteries, bulbs, fishing lure, etc. Similarly, a beverage holder could be incorporated into the system 10 on a side of the housing 12 to retain a liquid beverage.

A horizontal platform could also be located on a surface of the housing 12 to provide work space. A hook sharpener, as known in the art, could alternatively be provided on a surface of the housing 12 to accommodate sharpening of fishing hooks. Where the system 12 is used for activating luminescent golf balls, the system 12 could include a golf ball and/or golf club cleaning device, as known in the art, on a surface of the housing 12.

In some embodiments, the system 10 may include a carrying case with attachments for the system for storage and transport of the system 10.

The housing 12, handle 16, and stand 14 of the system 10 may be made of various materials, such as plastics, metal, rubber, polymers, etc., for light weight and durability.

As mentioned, in some embodiments, the system 10 includes rechargeable batteries or is configured for connection to an outlet of power, such as a wall outlet or external battery. As illustrated in FIG. 2, in some embodiments, the system 10 may include an electrical port 44 for connecting an electrical cord to the power source. For example, if the system includes a rechargeable battery, the electrical port 44 can be used to connect the batter to a battery charger. In some embodiments, the system 10 may include a cord for connecting the power source to an outlet. In these instances, the system 10 may further include a retractable cord storage mechanism for cord storage.

The following U.S. patents describe systems for illuminating a luminescent object. The contents of these patents are incorporated herein by reference. The aspects described in such patents are contemplated for combination and/or incorporation into embodiments of the above described system: 1) U.S. Pat. No. 5,311,413 to Farmer et al. and entitled Device for instantaneously energizing glow bait used for fishing and 2) U.S. Pat. No. 5,388,039 to Dolph and entitled Method of and apparatus for activating fish attractors having a luminescent surface which is light activatable.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, combinations, and modifications of the just described embodiments can be configured without departing from the scope and spirit of the invention. Therefore, it is to be understood that, within the scope of the appended claims, the invention may be practiced other than as specifically described herein.

What is claimed is:

1. A system for providing a light source for activating a luminescent object, said system comprising:
   a housing formed of at least two housing portions,
   wherein a first housing portion of the housing forms a light containment cavity, having an object retainer therein, and at least one opening configured for receiving the luminescent object into the object retainer, wherein the object retainer is formed of a translucent material and at least a portion of the light containment cavity surrounding the object retainer is formed of a non-translucent material, wherein the object retainer is defined independently of the sidewalls of the light containment cavity, and
   wherein a second housing portion of the housing is configured to contain a light source for providing light for activating an luminescent object that may be placed in the light containment cavity of the first housing portion,
   wherein the first and second housing portions are operatively connectable and separable from each other such that in a connected configuration, the light source of the second housing portion is aligned with the containment cavity of the first housing portion for emitting light into the containment cavity, and wherein in a separated configuration, the second housing portion and light source can be used independently as a light,
   wherein a first electric switch is located on an exterior surface of the second housing portion for supplying electrical power to the light source in the second housing portion,
   wherein a second electric switch is located on an exterior surface of the first housing portion for supplying electrical power to the light source in the second housing portion, and
   wherein the first and second electric switches are configured electrically in parallel so that either switch may supply electrical power to the light source in the second housing portion.

2. A system according to claim 1, wherein the first housing and second housing portions include structures that allow the first and second housing portions to be connected to one another.

3. A system according to claim 1, further comprising a seal between said housing portions, wherein the seal comprises means for excluding any one or more of moisture, dirt, debris and air from said interior of said coupled first and second housing portions.

4. A system according to claim 1 further comprising a handle coupled to said second housing portion.

5. A system according to claim 4, wherein said handle is articulated and is configurable in the following positions:
   an orientation generally parallel to a longitudinal dimension of the second housing portion, and
   an orientation generally perpendicular to a lateral dimension of the second housing portion, and
   wherein said handle is selectively rotatable from the generally parallel orientation to the generally perpendicular orientation.

6. A system according to claim 1, wherein said second switch located on the first housing portion is positioned adjacent to the at least one opening of the first housing portion at a distance to allow a user to both cover the opening with a hand and activate said switch with the same hand.

7. A system according to claim 1, wherein the light containment cavity surrounding the object retainer further comprises a reflective layer to reflect light from the light source in a direction toward the luminescent object.

8. A system according to claim 1 further comprising a stand coupled to said first housing portion and configured to support said first housing portion on a support surface.

9. A system according to claim 1 wherein at least one of said first and second housing portions comprises at least one storage compartment.

10. A system according to claim 1 wherein said second housing portion comprises a retractable cord storage mechanism.

11. A system for providing a light source for activating a luminescent object comprising:
   a first housing portion forming a light containment cavity, said light containment cavity having an object retainer therein and at least one opening configured for receiving the luminescent object into the object retainer, wherein the object retainer is formed of a translucent material and at least a portion of the light containment cavity surrounding the object retainer is formed of a non-translucent material, and wherein the object retainer is defined independently of the sidewalls of the light containment cavity;
   a second housing portion containing a light source; and
   a first electric switch is located on the second housing portion and configured to selectively, electrically connect the light source in the second housing portion to a power source,
   wherein a second electric switch is located on the first housing portion for supplying electrical power to the light source in the second housing portion, and
   wherein the first and second electric switches are configured electrically in parallel so that either switch may supply electrical power to the light source in the second housing portion;
   wherein said second housing is operably removable from said first housing portion, such that the second housing portion may be used as a light source independent from said first housing portion; wherein said first electric switch can be used to supply power to the light source when said first housing portion is connected to said second housing portion and when said second housing portion is removed from said first housing portion sand used as a separate light second housing portion.

12. A system according to claim 11 further comprising a handle coupled to said second housing portion.

13. A system according to claim 12, wherein said handle is articulated and is configurable in the following positions:
   an orientation generally parallel to a longitudinal dimension of the second housing portion, and
   an orientation generally perpendicular to a lateral dimension of the second housing portion, and
   wherein said handle is selectively rotatable from the generally parallel orientation to the generally perpendicular orientation.

14. A system according to claim 11 further comprising a stand coupled to said first housing portion and configured to support said first housing portion on a support surface.

15. A system according to claim 11 wherein at least one of said first and second housing portions comprises at least one storage compartment.

16. A system according to claim 11 wherein said second housing portion comprises a retractable cord storage mechanism.

17. A system according to claim 11 wherein said second switch located on the first housing portion is positioned adjacent to the at least one opening of the first housing portion at a distance to allow a user to both cover the opening with a hand and activate said switch with the same hand.

* * * * *